(12) United States Patent
Kim

(10) Patent No.: US 11,859,391 B2
(45) Date of Patent: Jan. 2, 2024

(54) BRACKET FOR CONNECTING WOODEN DECKS, AND WOODEN DECK COUPLING STRUCTURE USING SAME

(71) Applicants: Gihong Kim, Pohang-si (KR); Jong Tae Kim, Yongin-si (KR)

(72) Inventor: Gihong Kim, Pohang-si (KR)

(73) Assignee: Gihong Kim, Pohang-si (KR)

( * ) Notice: Subject to any disclaimer, the term of this patent is extended or adjusted under 35 U.S.C. 154(b) by 0 days.

(21) Appl. No.: 18/044,220

(22) PCT Filed: Sep. 7, 2021

(86) PCT No.: PCT/KR2021/012171
§ 371 (c)(1),
(2) Date: Mar. 7, 2023

(87) PCT Pub. No.: WO2022/050827
PCT Pub. Date: Mar. 10, 2022

(65) Prior Publication Data
US 2023/0243161 A1 Aug. 3, 2023

(30) Foreign Application Priority Data
Sep. 7, 2020 (KR) .......................... 20-2020-0003242

(51) Int. Cl.
*E04F 15/04* (2006.01)
*F16B 15/08* (2006.01)
*E04F 15/02* (2006.01)

(52) U.S. Cl.
CPC ........ *E04F 15/02044* (2013.01); *E04F 15/04* (2013.01); *E04F 2015/02111* (2013.01); *F16B 15/08* (2013.01)

(58) Field of Classification Search
CPC ................ E04F 15/02094; E04F 15/04; E04F 15/02044; E04F 2015/02111; F16B 2015/0038; F16B 15/0076; F16B 15/08
See application file for complete search history.

(56) References Cited

U.S. PATENT DOCUMENTS 3,037,590 A * 6/1962 Pavlecka ................... E04C 2/08
52/592.1
3,186,525 A * 6/1965 Gresham ................... E04C 2/08
52/630
(Continued)

FOREIGN PATENT DOCUMENTS

KR 101176363 B1 * 8/2012
KR 20120012621 A * 10/2012
(Continued)

*Primary Examiner* — Phi D A
(74) *Attorney, Agent, or Firm* — NKL Law; Byungwoong Park

(57) ABSTRACT

The present invention is regarding a structure for fastening decking lumber woods for a wooden deck. The present invention includes a first deck wood (10a) and a second deck wood (10b) with a form of a certain thickness and extended to a certain length and the cross member, the joist, placed underneath and perpendicular to the deck lumber woods, and the bracket (100) that allows to fix the first deck wood (10a) and the second deck wood (10b) onto the cross member with a fastening material through the gap space between the deck woods without touching them so the deck wood can breath freely thus, preventing them from splitting.

3 Claims, 5 Drawing Sheets

(56) References Cited

U.S. PATENT DOCUMENTS

| | | | | |
|---|---|---|---|---|
| 3,230,931 | A * | 1/1966 | Taylor | A01K 1/0151 |
| | | | | 119/529 |
| 3,995,593 | A * | 12/1976 | Bowser | A01K 1/0151 |
| | | | | 119/529 |
| 9,546,455 | B2 | 1/2017 | Forbes | |
| 9,822,809 | B2 * | 11/2017 | Shadwell | F16B 15/0038 |
| 2010/0180532 | A1 * | 7/2010 | Martel | E04F 21/1855 |
| | | | | 403/230 |
| 2011/0314765 | A1 * | 12/2011 | Martel | F16B 12/00 |
| | | | | 403/217 |
| 2013/0025228 | A1 * | 1/2013 | Kilgore | E04F 15/04 |
| | | | | 403/375 |
| 2014/0021236 | A1 * | 1/2014 | Martel | F16B 15/02 |
| | | | | 227/18 |
| 2017/0045069 | A1 * | 2/2017 | Martel | E04F 15/02183 |

FOREIGN PATENT DOCUMENTS

| | | |
|---|---|---|
| KR | 10-2012-0123759 A | 11/2012 |
| KR | 20-0466046 Y1 | 3/2013 |
| KR | 10-2014-0110309 A | 9/2014 |
| KR | 101773040 B1 | 8/2017 |
| KR | 10-2128600 B1 | 7/2020 |

\* cited by examiner (a)

(b)

BRACKET FOR CONNECTING WOODEN DECKS, AND WOODEN DECK COUPLING STRUCTURE USING SAME

TECHNICAL FIELD

The present invention is regarding a bracket for connecting deck floor lumbers onto the deck frame and associating wood deck structure using the invention. More in detail, the bracket is installed through the gap between two adjacent deck lumbers on the surface of the deck, which allows strong connection of the deck woods to the deck frame to prevent twisting, warping, and splitting of the deck woods due to repeated shrinking and expanding of the deck woods caused by changing weather condition (breathing of wood) and repeatedly shifting of loads.

BACKGROUND

Wooden decks of wide variety appropriate for surroundings and purposes are being constructed and used for suburban housing, trail ways, and picnic roads for the purpose of beauty, nature preservation, or for safety or convenience of the pedestrians especially in the case of hazardous road.

The most basic elements of such a common wooden deck include vertical supporting columns constructed at the base of the deck in the left and the right and front and back sides of the deck foot print in a regular interval, top of which are fitted with horizontal frame members, also called joist, on which usually pre-fabricated deck woods are fixed usually with a means nails, screws, or bolts to form the floor surface of the deck. The supporting columns along with the horizontal members or joists above together form the frame structure of the deck.

The conventional wooden deck construction uses nails as the major means of fastening the deck woods to the deck frame, which is time consuming and has a problem of low work efficiency. Furthermore, the fasteners such as nails installed on the deck surface are exposed and are not only unsightly but also can even cause safety hazards if they are rusted and heaved out of the surface.

Especially wooden decks suffer from repeated shrinking and expanding action of the deck wood (wood breathing) caused by the weather and moving loads caused by the traffic, which result the nails to heave up and splitting of the deck wood rendering their function as the faster ineffective and danger. With the fasteners not effectively holding the deck woods in place, the deck woods separate from the deck frame and rise and warp and/or split, especially where two deck woods join. This not only reduces the overall life of the deck but also creates safety hazards for the pedestrians. In order to remedy this kind of problems, the bracket for mounting the wood decks onto the frame is required.

As a related patent, there is Patent No. 10-1773040 (Clip Bracket for Upper Plate Connecting of Wood Deck), which introduces only a clip type fastener.

TECHNICAL CHALLENGE

The problem intended to be solved by this proposed invention is to realize a bracket that can simplify mounting the deck woods onto the deck frame (or joist) for a wooden deck construction that can also be installed in a pre-existing deck (as a retrofit/repair) as well as in a new construction.

SUMMARY

The fastening structure for the proposed invention involves the a first deck wood (10a) and a second deck wood (10b) that have a certain thickness and a length, and the cross member (20a)—usually called joist—that is placed under the first deck wood and the second deck wood perpendicular to them onto which the first deck wood and the second deck wood are to be fixed on, and the bracket (100) that covers the gap space between the first deck wood (10a) and the second deck wood (10b) and screwed directly on the cross member (20a) through the gap space, thus, holding down both of the deck woods onto the said cross member without touching the deck woods.

Bracket (100) contains bracket body (105), fastening groove (110), deck wood holder tap (120), and side incline (130), which are formed at both sides of the bracket body, and are slopped downward with respect the bracket's main body with the side incline (130) with angle of 5-15 degree which are formed at both edges of the bracket, and include the deck wood holder tap (120) that holds down the both edges of the deck woods at both sides of the bracket.

Effects of the Invention

According to the present proposal, due to the bracket installed in between two adjacent deck woods, the deck woods are held down better and firmer, without screws or nails going through them and the loosening of the deck woods is prevented.

Also, since the bracket is installed so that the adjacent deck woods stay aligned together, it helps to keep the deck surface stay flat, thus, offering a special advantage of better assurance of pedestrian's safety by preventing their being caught by uneven deck surfaces between the adjacent deck woods.

Also, installation of the deck wood is made simpler without having to install many nails on the narrow joist (FIG. 1), thus, resulting in better work efficiency and saving in the nails and screws.

Also, it prevents twisting and warping and splitting of the deck woods due to seasonal weather changes.

DETAILED DESCRIPTION

Specific structural or functional descriptions disclosed in the present specification will be provided only in order to describe exemplary embodiments of the present disclosure. Therefore, exemplary embodiments of the present disclosure may be implemented in various forms, and the present disclosure is not to be interpreted as being limited to exemplary embodiments described in the present specification.

Since exemplary embodiments of the present disclosure may be variously modified and may have several forms, they will be shown in the accompanying drawings and be described in detail in the present specification. However, it is to be understood that exemplary embodiments of the present disclosure are not limited to specific forms, but includes all modifications, equivalents, and substitutions included in the spirit and the scope of the present disclosure.

Terms used in the present specification are used only in order to describe specific embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof stated in the present specification, but do not preclude the presence or addition of one or more other features, numerals, steps, operations, components, parts, or a combination thereof.

Hereinafter, exemplary embodiments of the present disclosure will be described in detail with reference to the accompanying drawings.

Figure 1A:
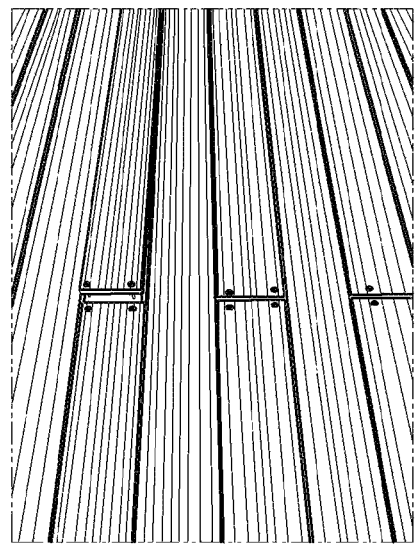
FIGS. 1A-1C are conceptual diagrams depicting the problem of the conventional wooden deck.
Figure 1B:
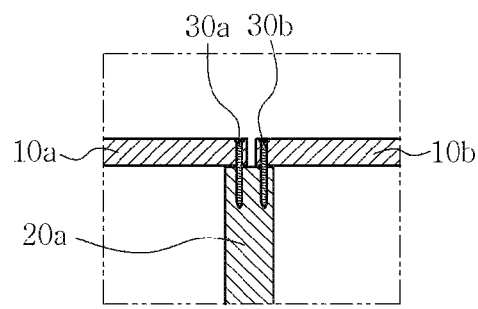
Figure 1C:
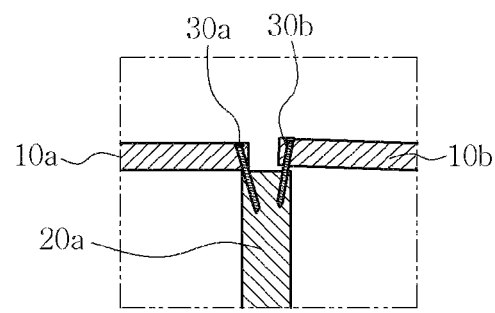

FIG. 1 is the concept diagram depicting the problem of the conventional deck construction. Referring to the FIGS. 1A-1C, a conventional wooden deck is in the structure whereby a first deck wood (10a) and a second deck wood (10b) touch lengthwise at their edge, and it is the standard practice that they are fastened to the cross member (20a) placed underneath them separately with metal fasters such as nails. However, if one refers to FIG. 1B, the deck suffers from the shrink and expand of the deck woods due to changing weather condition and their warping and bend due to repeated load that result in distortion and of the fastening and splitting of the deck wood frequently.

Figure 2A:
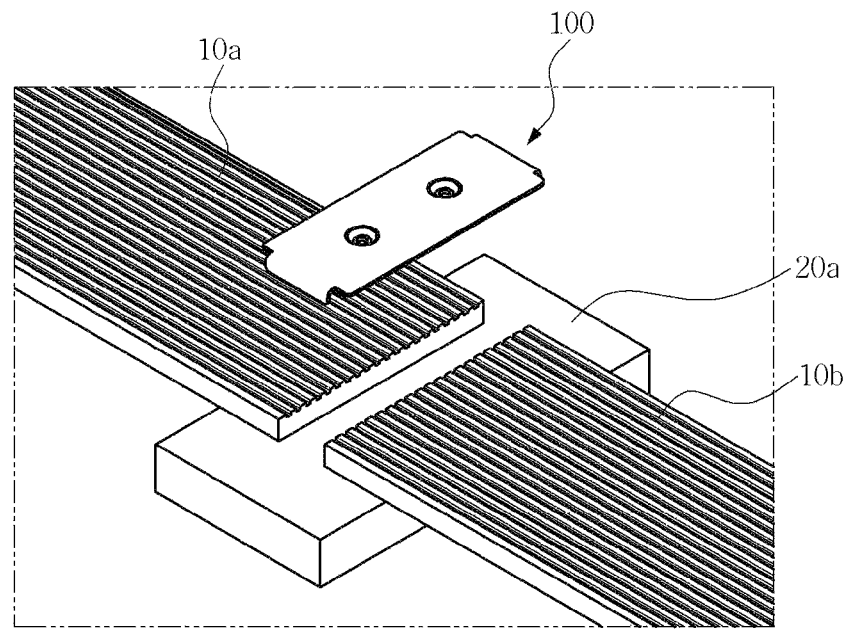
FIGS. 2A-2B are conceptual diagrams depicting the bracket for connecting the deck woods according to the first embodiment of the current invention.
Figure 2B:
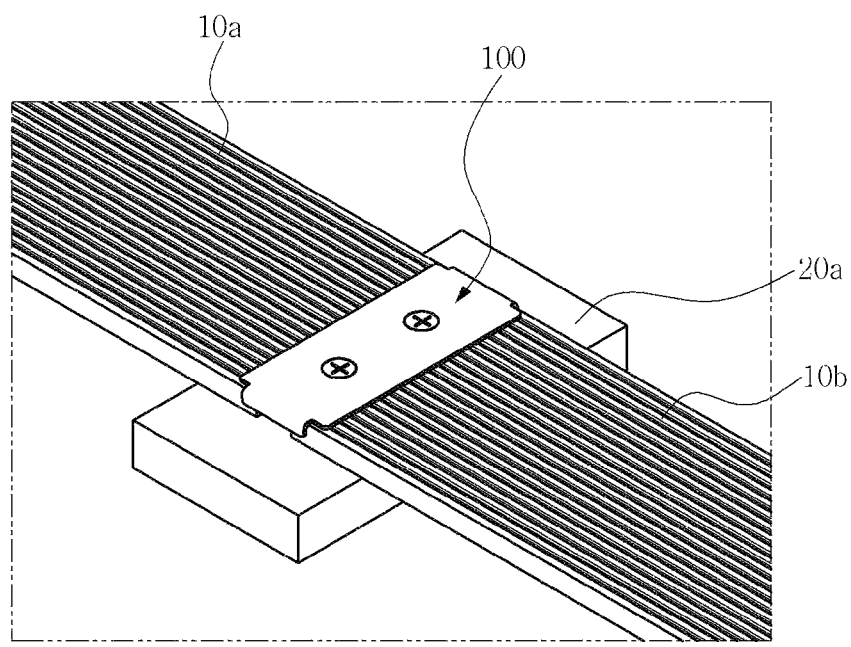

FIGS. 2A-2B are concept diagrams depicting the bracket for mounting deck woods according to the first embodiment of the present invention. Referring to FIGS. 2A-2B, the present invention is devised to solve the problem depicted as in FIGS. 1A-1C whereby brackets are placed over the regularly occurring gaps between the first deck wood (10a) and the second deck wood (10b) and are directly mounted onto the horizontal member or joist (20a) located underneath the deck woods through the gaps between the said deck woods (10a) and (10b) with a fastener such screws, so the deck woods (10a) and (10b) are firmly placed onto the horizontal member (20a) by the bracket and the deck woods never bend or twist under the bracket.

FIG. 2A is a depiction before mounting of the bracket and FIG. 2B is a depiction after mounting of the bracket.

The structure for fastening the deck woods of the present invention consist of the first deck wood (10a), the second deck wood (10b), the cross member (20a), and the bracket (100). The first deck wood (10a) and the second deck wood (10b) have a certain thickness and a length, and the cross member (20a)—usually called joist—is placed under and perpendicular to the first deck wood (10a) and the second deck wood (10b), onto which the first wood (10a) and the second deck woods (10b) are to be mounted on. The bracket (100) is laid on the gap space between the first deck wood (10a) and the second deck wood (10b), and it is directly screwed onto the cross member (20a) through the holes on it and the gap space between the first deck wood (10a) and the second deck wood (10b) without touching them, thus, the bracket (100) holding down both of the said the deck woods (10a) and (10b) onto the said cross member (100) with freedom to shrink and expand lengthwise for breathing. The bracket of the present invention can be installed in an existing deck for repair or retro-fit with minimum cost, or can be installed for a new installation.

Figure 3:
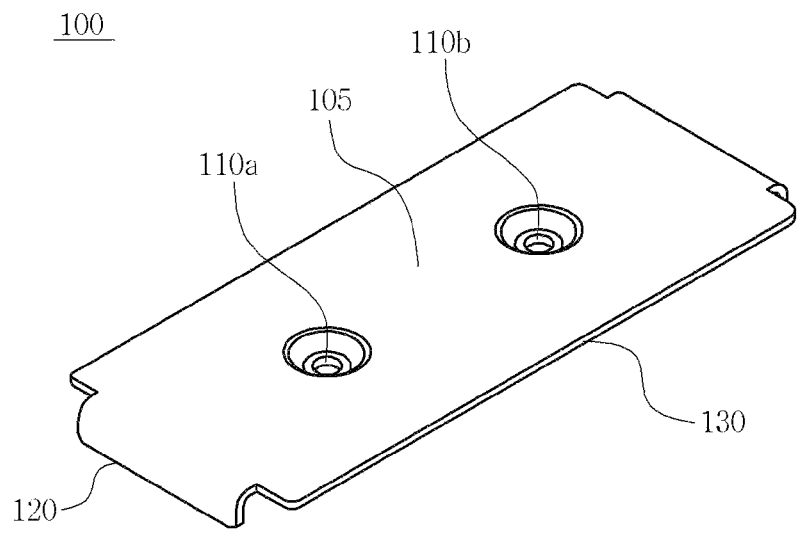
FIG. 3 is a perspective diagram depicting the bracket according to the first embodiment of the current invention.

FIG. 3 is a perspective diagram of the bracket according to the first embodiment of the present invention.

Referring to FIG. 3, the bracket (100) consists of the bracket body (105), the deck wood holder tap (120), the side incline (130), and fastening groove (110a and 110b). The bracket (100) shown as an example is of metallic material and has certain thickness, and the thickness above is in the range of 0.4 mm to 0.6 mm. The horizontal size of the bracket (100) is 4.2 cm and its vertical size is 9.2 cm.

The deck wood holder tap (120) is formed at both sides of the said bracket body and is to hold down the end of the first wood deck and the second wood deck without slipping out. The deck wood holder tap has height of 0.6 cm and has certain curvature at the bending to conform to the corner curvature of the deck woods. This allows tight holding of the wood decks.

The side incline (130) is formed in both sides of the said bracket body and is slopped downward with respect the bracket's main body with the slope of 4 to 6 degrees. The width of the side slope is 0.5 to 0.7 cm. Both the said side incline (130) of the bracket are to make the bracket flat on the deck surface as much as possible so the pedestrians can walk without being caught by the brackets and also to minimize the wear and tear on the bracket due to the traffic.

In the middle of the bracket body (105), In the example, there are two fastening grooves (100a and 100b) for fasteners and two fasteners can be installed through them directly onto the cross member through the gap between the deck woods without touching the deck woods.

Figure 4:
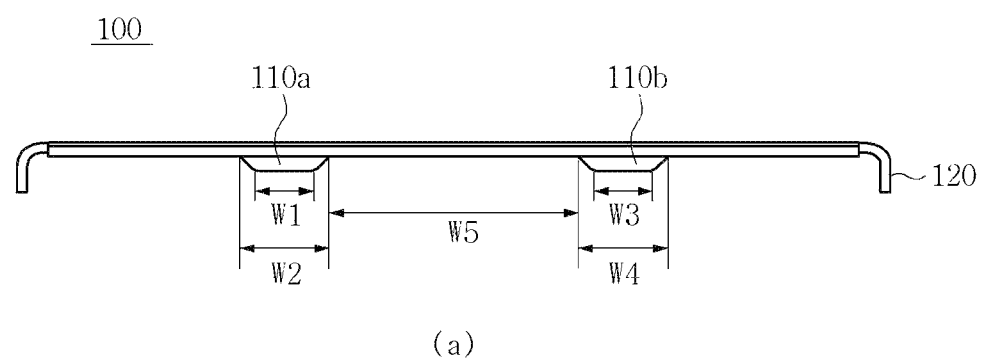
FIG. 4 is the front and side view diagram depicting the bracket according to the first embodiment of the current invention.
Figure 4:
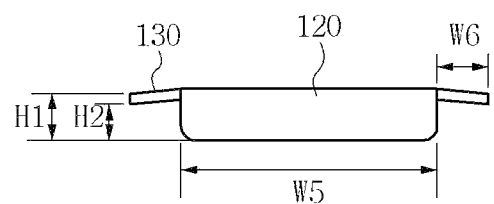

FIG. 4 is the front and side views depicting the bracket according to the first embodiment of the present invention. Referring to FIG. 4, a first fastening groove (110a) and a second fastening groove (110b) are placed in the middle and the lower diameter (w2) of the first fastening groove (110a) and the lower diameter (w4) of the second fastening groove (110b) are identical and the upper diameter (w1) of the first fastening groove (110a) and the upper diameter (w3) of the second fastening groove (110b) are identical. The horizontal distance (w5) is 0.4 cm.

Figure 5A:
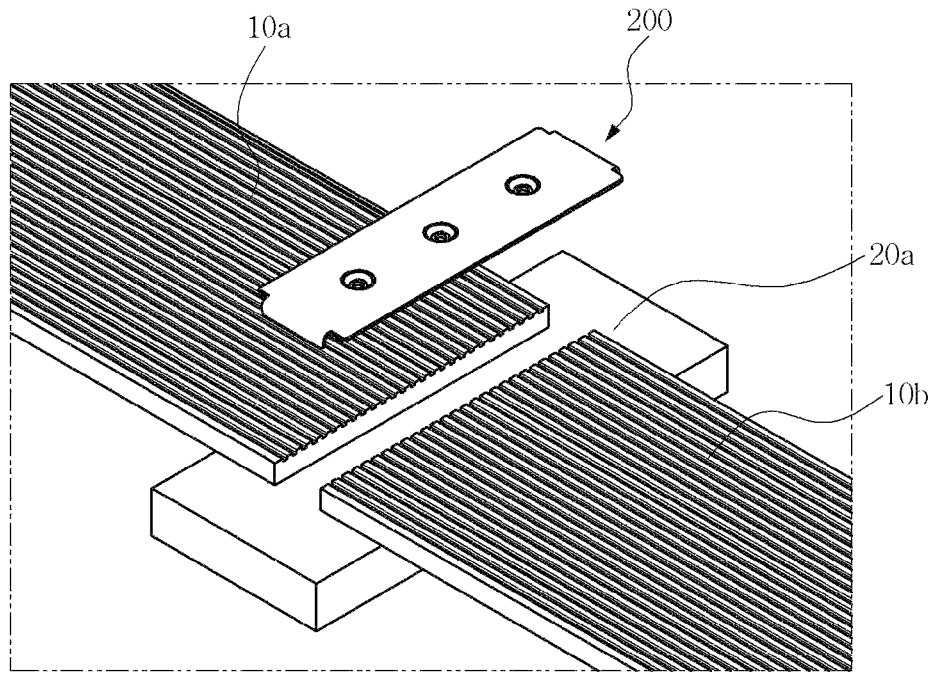
FIGS. 5A-5B are perspective diagrams depicting the bracket according to other embodiments of the current invention.
Figure 5B:
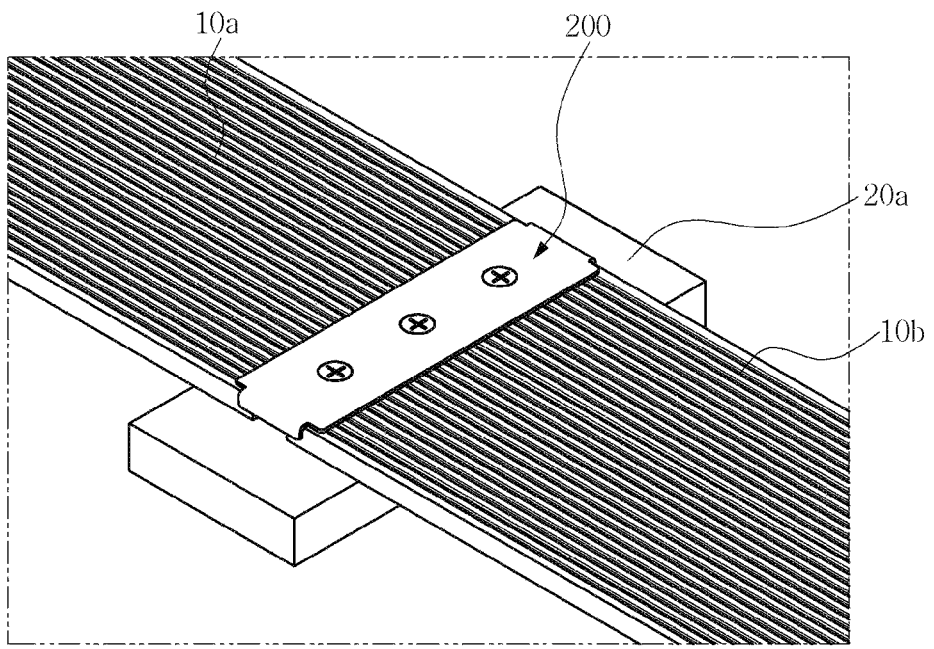

FIGS. 5A-5B are perspective diagrams depicting the bracket according to other embodiments of the current invention.

Referring to FIGS. 5A-5B, as another trial example of the present invention, the bracket can have three fastening grooves, and there is no limitation of the number.

Figure 6:
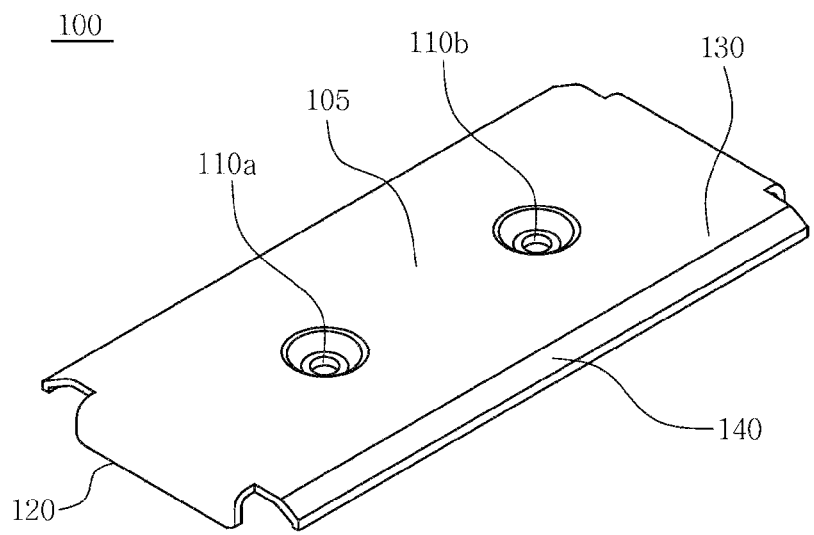
FIG. 6 and FIG. 7 are the perspective diagram depicting the bracket according to other embodiments of the current invention.
Figure 7:
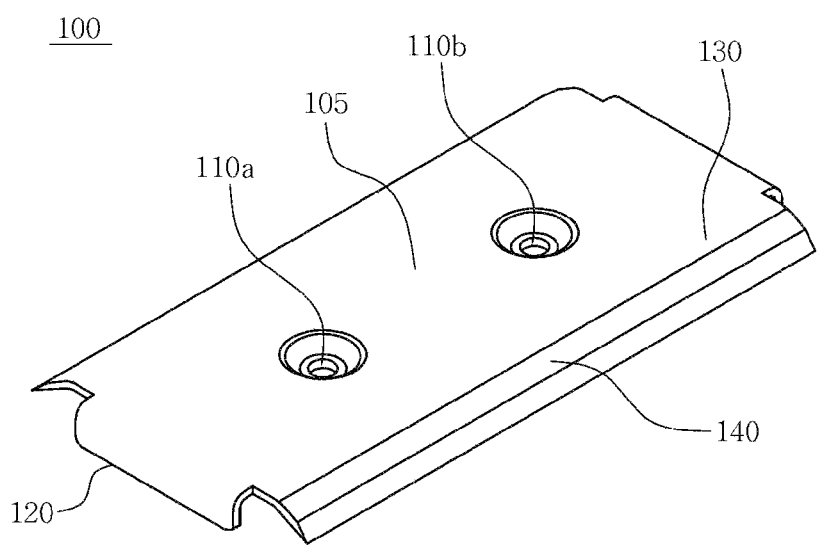

FIG. 6 and FIG. 7 are the perspective diagrams depicting the bracket according to other embodiments of the current invention.

FIG. 6 and FIG. 7 are the perspective diagrams depicting the deck wood fastening structure with the features that includes a edge bevel (140) at both ends with angle of 10 to 60 degree at the end of the both sides. The edge bevel (140) can ensure safety so that pedestrians can walk without getting caught through the inclined angle.

Although the present disclosure has been described with reference to exemplary embodiments shown in the accompanying drawings, it is only an example. It will be understood by those skilled in the art that various modifications and equivalent other exemplary embodiments are possible from the present disclosure. Accordingly, an actual technical protection scope of the present disclosure is to be defined by the following claims.

What is claimed is:

1. A wooden deck coupling structure, comprising:
a first deck wood and a second wood configured to have a predetermined thickness and a predetermined length;
a cross member configured to be provided below and in a perpendicular direction with respect to the first deck wood and the second deck wood, fixing the first deck wood and the second deck wood;
a bracket configured to be provided over a gap between the first deck wood and the second deck wood, and in order to couple the first deck wood and the second deck wood, the bracket further configured to fix coupling members onto the cross member, through the gap in between the first deck wood and the second deck wood, without going through the first deck wood and the second deck wood,
wherein the bracket comprises a bracket body, side inclines, and holder taps,
wherein the side inclines are formed at both sides of the bracket body, and are slopped downward with respect to the bracket body with a predetermined angle range from 5 to 15 degree,
wherein holder taps are formed at another both sides of the bracket body, holding down ends of the first deck wood and the second deck wood to the cross member,
wherein a width of the side inclines is from 0.5 to 0.7 cm, and
wherein the holder tap has a height of 0.6 cm and has a predetermined curvature,
wherein the ends of the first and the second deck woods under the holder taps are free to move within a space between the holder taps while the first and the second deck woods breathe,
wherein the bracket is the deck wood fastening structure with the features that includes edge bevel at both ends with angle of 10 to 60 degree at the end of the both sides.

2. The wooden deck coupling structure claim 1,
wherein the bracket is a deck wood fastening structure configured to include the holder taps formed at both sides of the bracket body, holding the ends of the first deck wood and the second deck wood.

3. The wooden deck coupling structure claim 1,
wherein the bracket is a deck wood fastening structure configured to include a plurality of fastening embossed holes, and the plurality of fastening embossed holes are two or three fastening embossed holes.

* * * * *